Nov. 19, 1935.   J. E. LILIENFELD   2,021,455
ELECTROLYTIC CONDENSER
Filed May 9, 1933     2 Sheets-Sheet 1
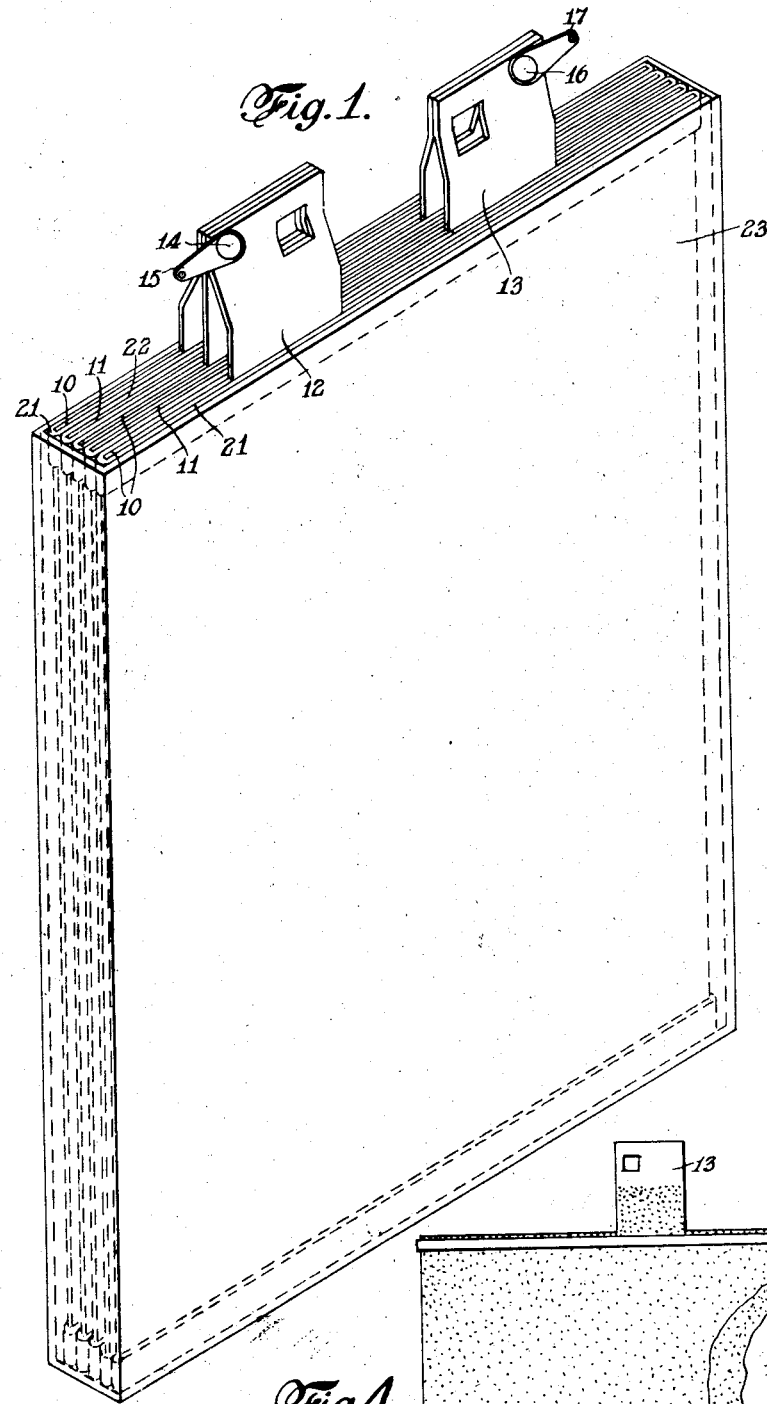
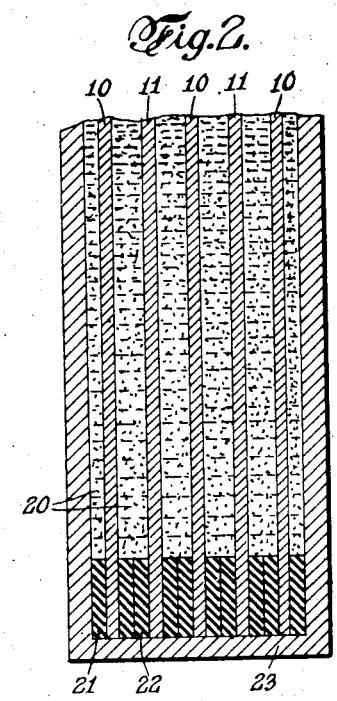
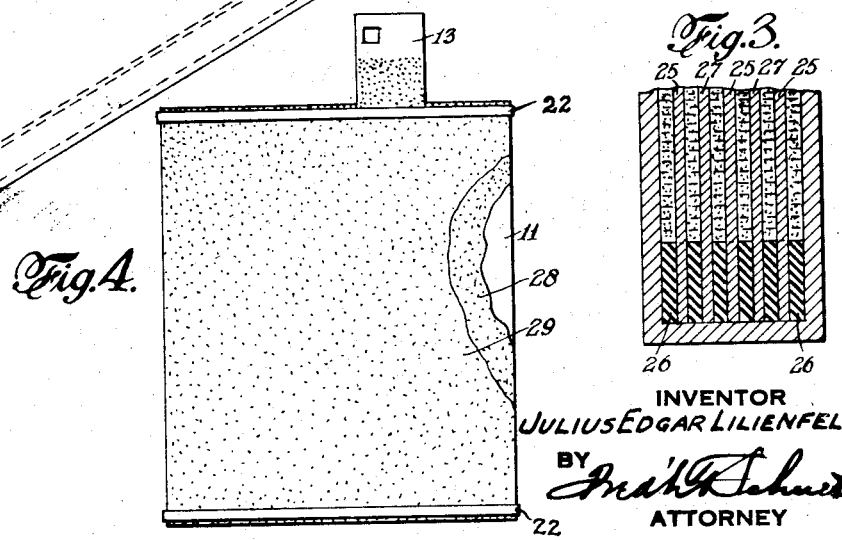
INVENTOR
JULIUS EDGAR LILIENFELD
BY
ATTORNEY

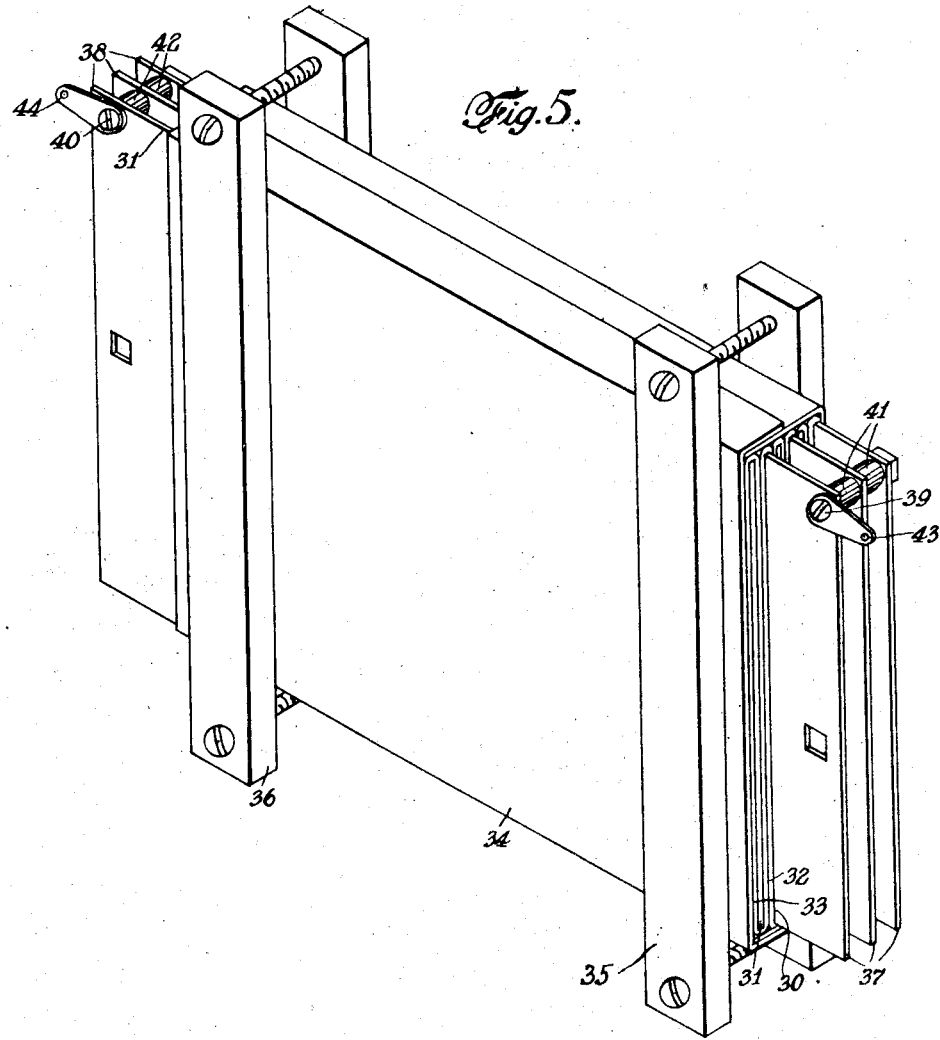

Patented Nov. 19, 1935

2,021,455

UNITED STATES PATENT OFFICE 2,021,455

ELECTROLYTIC CONDENSER

Julius Edgar Lilienfeld, Winchester, Mass., assignor to Ergon Research Laboratories, Inc., Malden, Mass., a corporation of Delaware Application May 9, 1933, Serial No. 670,084

4 Claims. (Cl. 175—315)

The invention relates to electrolytic condensers and, with reference to their use with alternating current, to a novel method of operation.

The inventon relates, also, to a method of forming an anode for use in the electrolytic condenser, and to the electrolyte utilized therewith.

The invention has for an object the provision of a novel electrolyte and of a nature whereby a condenser is rendered self-healing; also, a novel manner of forming therewith an anode for use in the electrolytic condenser.

Still another object of the invention resides in the provision of a low freezing point electrolyte and one which is of a highly viscous and hygroscopic (non-drying) nature, and suitable for use, furthermore, with or without separator elements between electrodes inasmuch as, in the case of narrowly spaced electrode plates, its viscosity is sufficient to prevent a short-circuiting contact therebetween.

The invention has for a further object the provision of an electrolyte paste involving the addition to the aforesaid viscous electrolyte of a very finely divided conductive and depolarizing filler material whereby to reduce the power loss in the electrolyte in addition to increasing the viscosity of the electrolyte. Another object of the invention resides in the provision of a double anode coating especially suitable in connection with the aforesaid electrolyte paste.

A still further object of the invention resides in the provision of resilient spacer and end-sealing means carried by an electrode; also to a novel electrode construction and assembly whereby enhanced cooling of the condenser is attained when the same is in operation.

Another object of the invention resides in the novel manner of continuously operating an alternating current electrolytic capacitor at commercial line voltages without biasing of the electrolyte, whereby simplicity in the capacitor set up and economy in the manufacture of the capacitor is attained, in that it becomes possible to utilize but a single-voltage type of capacitor which may be adapted for various operating voltages that are multiples of the rated capacitor voltage.

The foregoing objects are attained, in part, by the use of a more or less viscous electrolyte composition of the nature hereinafter set forth and in the particular formation of anodes thereby; also, by the placing in series of a plurality of capacitors to the required total operating voltage, each capacitor being operated within the range of voltages of which the critical bias is zero.

The nature of the invention, however, will best be understood when described in connection with the accompanying drawings, in which:

Fig. 1 is an isometric projection of the novel electrolytic condenser.

Fig. 2 is a fragmentary transverse section, on an enlarged scale, of the condenser; and Fig. 3 is a similar view illustrating a modification.

Fig. 4 is an elevation of an anode element utilized in the condenser.

Fig. 5 is an isometric projection illustrating a modification in the condenser construction.

Figs. 6 and 7 are diagrammatic views illustrating the manner of connecting a condenser to an alternating current circuit for effecting power factor correction thereby, Fig. 7 also illustrating the novel arrangement whereby single-voltage condensers may be adapted for various operating voltages which are multiples of the said condenser voltage.

This application is a continuation in part of my prior applications Serial Nos. 560,140 and 560,141, filed August 29, 1931.

Referring to the drawings, more particularly Figs. 1 and 2 thereof, an electrolytic condenser of the direct current type is disclosed, the same comprising a plurality of cathode elements as the metal sheets or plates 10 between which are located the anode elements as the plates or sheets 11 which may be of aluminum, tantalum or other filming metal.

The former elements 10 are provided with tabs 12 and the latter elements 11 similarly with the tabs 13, the same extending from their respective upper edges and secured at their outer ends, as by means of a rivet 14, and to a terminal lug 15. The anode tabs 13 are likewise secured to each other as by means of a rivet 16 and to a terminal lug 17 adapted for external connection.

In accordance with the invention, the respective anodes and cathodes are separated from each other through the medium of the electrolyte 20 which is in the condition of a highly adhesive and viscous or pasty mass, of the nature hereinafter set forth. The spacing of these plates may be further insured and a sealing effected at the ends of said plates by the provision of resilient means, as rubber bands or the like 21 and 22 which are respectively held over the cathodes and anodes at their corresponding upper and lower ends and transversely to an electrode element, as shown.

In assembling the condenser after the anodes have first been formed and the electrolyte applied thereto, and/or to the cathode elements, the respective electrode elements are located to form a stack with an anode element between two cathode elements, the resilient members about their respective ends contacting to insure separation of the one element from the other and at the same time providing end sealing means for the electrolyte retained between the electrodes. The unit may then be inserted into a suitable container or housing 23 which may be of insulating material such as cardboard or of suitably insulated metal and open at the top to permit access to the tabs 12 and 13, or rather, their terminal lugs 15 and 17, respectively.

In assembling the electrodes for the condenser, the rubber bands about the ends of an intermediate element may be omitted, if desired, as the bands about the adjacent electrodes will suffice. Thus, as indicated in Fig. 3 of the drawings, the cathode elements 25 only are provided with bands 26 while the anode elements 27 bear directly against these bands along the respective lower and upper ends of an anode element, as indicated.

Furthermore, in effecting the formation of an anode, the tab 13 thereof is also formed for a portion of its length and to such an extent as to insure at least a formed surface of the anode beyond the sealing and spacing member or band 22 of its upper end, so that the surface portion of an anode upon which a band presses will always be constituted as a formed area.

The assembly of a condenser in the manner aforesaid and embodying solely a viscous or pasty electrolyte between electrodes for preventing electrical contact therebetween and/or end sealing means, such as the rubber bands set forth, necessitates the provision of a novel formed layer, or rather two layers 28 and 29, upon the anode surfaces. These layers are of the nature more particularly set forth in my copending application for Letters Patent of the United States, Serial No. 560,141, filed August 29, 1931, for Filming metal coatings and method of forming the same. The novel bilaminate coating therein disclosed comprises two layers, as the layers 28 and 29, which are molecularly associated with the underlying anode material 11, such as aluminum, tantalum, etc., and with each other—the proximate layer 28 constituting the usual active and dielectric film and the outer layer 29 being in the nature of a protective coating which is inactive and also conductive to OH ions in the presence of water or an aqueous vapor.

A particular characteristic of this novel bilaminate coating is its irreversibility in application, that is to say, the inactive layer cannot be imposed over the active film but must first be formed upon the filming metal, whereupon it is possible to underimpose the said active layer. For example, an anode may be formed, for the purpose of providing the inactive layer, in $\frac{1}{10}$ normal phosphoric acid at a temperature of 30–35° C., and at a current density of 5 ma. per square cm.—the formation requiring about one-half hour.

Before underimposing beneath this layer the active layer, the formed anode is thoroughly washed in preferably hot distilled water, whereupon formation is effected to provide the active layer 28 beneath the inactive layer 29. This original or inactive layer may be formed also in such other suitable electrolytes as possess the property of maintaining substantially the value of the electrolizing current at a constant voltage. For example, a formation in a 7% sulphuric acid solution at a temperature of 40–45° C., and at a current density of 12 ma. per square cm., will afford a satisfactory inactive layer; or, the filming metal may be variously oxidized or etched, all of which is more fully set forth in my aforesaid copending application, and no claim is made herein specifically to this novel coating.

These bilaminate coatings, furthermore, are of especial value in condensers of the aforesaid nature where the electrolyte itself may constitute also the medium for electrically separating one electrode from its adjacently disposed electrode, and particularly to prevent mechanical injury of the underimposed dielectric active layer of the anode coating.

Said bilaminate coatings present, moreover, electrical advantages, such as a higher breakdown voltage, when the paste is constituted by the electrolyte and a conducting and depolarizing filler, such as carbon and particularly lamp black, graphite, or combinations of lamp black and graphite. For increasing the conductivity of the electrolyte and thereby reducing the power loss, lamp black in excess of 6% by weight of the electrolyte may be utilized, and the consistency of the latter increased thereby to the extent desired.

As a depolarizing agent, this lamp black thus incorporated with the electrolyte prevents the latter from losing water during the operation of the condenser as a result of the electrolysis of said electrolyte, inasmuch as the products of decomposition recombine in contact with the lamp black. This action is especially marked in connection with the use of viscous electrolytes, and more particularly in the case of an electrolyte of the nature hereinafter set forth. In connection with the operation of so-called "dry" type condensers, this depolarizing property of the filler in insuring against loss of water is particularly advantageous.

Also, in view of the provision of a bilaminate coating of the aforesaid nature, the advantage of utilizing a conducting filler is retained without the disadvantage of lowering of the sparking voltage which in some instances is very considerable—the break-down voltage otherwise dropping from 700 volts to 430 volts upon admixture of the filler. This action may be accounted for by the following explanation. The bodily presence of conducting dust or filler particles upon the active layer disturbs the field of and also exerts a mechanical influence upon said layer. Therefore, by underimposing the active layer beneath the inactive stratum or layer, the filler material is unable to contact with such active layer and the objectionable features hereinbefore noted are obviated.

As a particularly desirable electrolyte for use in the novel condenser as well as a formation electrolyte for the anodes thereof, I utilize a highly polymerized or condensed, and therefore highly viscous, reaction product of a polyhydric alcohol with a weak mineral or organic acid and a water-soluble salt, the viscosity being higher than that of glycerine.

Other synthetic resinous products may be utilized such, for example, as the product (Trihydroxyethylamine) obtained by reacting upon abietic acid with ammonia or an amine, utilizing a large excess of the former. Some of these products are known commercially as "Aquaresin Q", "Glycolboriborate", and "Aquaresin T"; and no claim is made broadly to these products, except as employed in an electrolytic condenser.

These electrolytes are of a highly viscous, substantially non-flowing or pasty nature and are also hydrolyzable. For formation purposes, as hereinafter set forth, various hydrolyzable and viscous electrolytes of the aforesaid type may be utilized with more or less success; but the aforementioned electrolytes have been found to give most satisfactory results. These electrolytes, furthermore, possess the further desirable feature of having a low freezing point, which property is of especial value when an electrolytic condenser is to be used under low-temperature conditions of the surrounding atmosphere. In imparting the self-healing characteristic to a condenser and because of their forming properties, these electrolytes are of especial value in connection with the operation of an electrolytic condenser.

One of the said electrolytes, "Aquaresin Q", may be obtained by reacting upon a glycol or other polyhydric alcohol with various weak water-soluble acids, either organic or mineral. For example, such glycols as ethylene glycol, diethylene glycol, triethylene glycol, erythrol, etc., may be treated with boric acid, citric or tartaric acid in the manner hereinafter set forth; and there may be added thereto a flux such as sodium tetraborate (borax). In accordance with the amount and nature of this flux added, whether neutral, acid, or basic, variations in the character of the product will be effected, more especially with respect to the degree of solubility in water and organic solvents, also, as to stability, viscosity and adhesiveness, hygroscopicity, resistance to hydrolysis, and electrical resistance.

In preparing the novel product, a suitable polyhydric alcohol, preferably diethylene glycol, is heated together with a weak water-soluble acid such as boric acid, either under normal or reduced pressure and together with an excess of a flux such as sodium tetraborate, until the proper consistency is obtained as may be determined by a test sample in chilling the latter. The fluxing matter may, of course, be omitted, but the resulting product will be correspondingly thinner.

It will be understood, of course, that many variations of the reaction product are possible, as this product may be made up of other alcohols, polyalkyl glycols, ether polyhydroxyalcohols, or other polyhydric alcohols; also, in place of the borax there may be substituted alkali salts as carbonates, alkali hydroxids, amines as ethylamine, hydroxyamine, tri-hydroxyethylamine, and diamines such as ethylene diamine.

By varying the proportions of the ingredients making up the novel reaction product, different consistencies and conductivities thereof may be obtained.

I have discovered that hydrolyzable electrolytes of the aforesaid nature, particularly the "Aquaresin Q", possess to a marked degree forming properties, as in providing the active insulating layer or film upon a filming metal such as aluminum, tantalum, etc. If desired, water may be added thereto or ionogens such as boric acid, borax, etc. Rapid formation with electrolytes of this nature is attained, possibly due to the smaller mobility of the OH ions in these viscous electrolytes.

The actual procedure in preparing the anodes for use in the condenser herein described is as follows: The inactive layer 29 is first formed upon the filming metal, for example, in the manner hereinbefore recited by forming the metal for about one-half hour in $\frac{1}{10}$ normal phosphoric acid at a temperature of 30–35° C., and at a current density of 5 ma. per square cm. The anode is then thoroughly washed, preferably with hot water, whereupon the active film 28 is underimposed by further formation in hot electrolyte of the nature of a highly viscous and hydrolyzable nature, for example the "Aquaresin Q" hereinbefore described. This electrolyte may be at a temperature of from 85° to 95° C., and the formation is to be accomplished at a voltage slightly in excess of the peak operating voltage of the condenser.

Thus, for a condenser suited for operation on 110 volts R. M. S. value—alternating current—the forming voltage should not be higher than between 175–200 volts, the excess voltage above the corresponding 155 peak volts being necessary because of possible voltage fluctuations of the power-supply lines with which the condenser is utilized. Similarly, a condenser designed for operation at 220 volts is to be formed at approximately 350 volts. To form the anode at voltages appreciably higher than the peak operating voltage, appears to be detrimental as it has been found that the power-factor of the condenser increases with the formation voltage when operated at voltages whose peak is considerably below the formation voltage. The formation will extend over a period which depends upon the formation current; and with a current density of 40 to 50 ma. per square inch, the formation may be completed in 5 minutes. The anode is then to be thoroughly washed with distilled water, and preferably water at a temperature of 85° C., for the purpose of hydrolyzing the residual electrolyte of the formed coating.

The properties of the coating in the operation of the condenser at 60 cycles are materially improved by this hydrolyzing action upon the electrolyte. A possible explanation of this may be that the products of the hydrolysis remain trapped within the pores of the coating after the washing operation; and as no layer as originally formed is perfect, these trapped products serve to repair the imperfections in the original film.

A further improvement and reduction of the power factor of the condenser may be obtained by a treatment with alternating current in the viscous electrolyte after the completion of the direct current formation. This treatment with alternating current may be performed in any well known or special manner, as, for example, by operating the plates electrically similarly to the manner in which they will eventually operate after assembly into the final capacitor.

Best results with the anodes are attained, particularly as to low-power-factor requirements with current at 60 cycles, if, after the washing operation of the double-coated anode, the formed anode is given a rapid treatment at the full peak voltage and in an aqueous solution of an ionogen, such as boric acid, boric acid with borax, salicyclic acid, etc.

While it is quite essential to treat the layer formed in the viscous electrolyte with water or an aqueous solution of an ionogen to effect the hydrolysis, it is not essential that the water be at a high temperature as the hydrolysis will occur as well with cold water, though more slowly due to the fact that the solution of the electrolyte therein is then not so rapid.

Furthermore, the provision of the inactive layer is not essential so far, at least, as the actual formation of a hydrolyzed layer is concerned, and this step may be omitted when it is not desired to provide an anode of the particular characteristics hereinbefore noted.

Anodes prepared as hereinbefore described may be assembled to provide an alternating current condenser or capacitor, for example, as in the manner shown more particularly in Fig. 5 of the drawings. In this type of condenser, and which is designed for the purpose of operation without bias of its electrolyte, the electrodes are all constituted as anodes but are separated into two independent groups. For example, one group of filming metal plates 30 constitutes one of the set of anodes, while the cooperating group is represented by the set of plates 31 which are to be individually separated and insulated from the first-named group 30 and to alternate therewith.

This may conveniently be effected, as hereinbefore described, by means of rubber bands 32 and 33, which are held transversely over the outer portions of the respective plates and afford at the same time end-sealing means for electrolyte retained between adjacent plates.

These anode plates are preferably provided, as in the hereinbefore described anode elements, with a bilaminate coating comprising an active and an inactive layer, and the electrolyte for use with these plates may also be of the viscous nature hereinbefore set forth and containing a conducting, depolarizing filler material to reduce the power loss in the operation of the condenser to a minimum—between two and two and one-half percent.

To seal the electrolyte space between plates laterally, as well as to hold the entire assembly together as a pack, it may be housed in an open-ended envelope or wrapper 34 placed or wound about the end plate; and such housing may consist of insulating material, cardboard, or metal insulated from the plates. A pair of clamping elements 35 and 36 about the ends of the plate and over the said envelope will serve not only to maintain the assembly of the pack but will exert the desired pressure upon the end-sealing means as the rubber bands.

The foregoing construction provides for a simple, inexpensive, and compact condenser arrangement and which admits, also, of providing for the ready cooling of the condenser to dissipate the heat generated through the power loss occurring therein. For example, the one set of plates 30 may be extended at one end of the condenser beyond the sealing means thereat, or displaced longitudinally with respect to the plates of the other set, to provide the cooling fins or surfaces 37 and, similarly, the other set of plates 31 may be extended at the opposite end of the condenser to provide the fins or cooling surfaces 38.

These extensions at the same time provide terminals for external connection, as by means of bolts or the like 39 and 40 which serve to interconnect the respective groups of plates in passing through the corresponding fins. Suitable spacer elements, such as bushings or eyelets 41 and 42, respectively, are provided between the fins of corresponding groups and through which a bolt passes; and terminal lugs 43 and 44 respectively are also retained by the bolt to the corresponding fins.

In the use of these alternating current condensers or capacitors, for example in power-factor-correction or as starting means for synchronous motors and the like, it has been found desirable, particularly from an economical stand-point, to manufacture the capacitors for but one rated voltage, say 110 volts R. M. S. value. Where the line voltage is the same as the rated voltage of the condenser, a condenser 50, Fig. 6 of the drawings, may be connected directly across the leads 51, 52, as indicated, the condenser being of the type illustrated in Fig. 4 and whose terminals 53 and 54 are then connected directly to the respective leads 51 and 52 and without any provision being made for biasing the electrolyte to a predetermined voltage.

Heretofore, it has been the practice in the operation of all alternating current condensers or capacitors for more than momentary periods to provide such bias, as indicated in U. S. Patent #926,128, to Moscicki; for, if the electrolyte is not biased, the active layer of an anode is required to act at certain times during the operation as a rectifier in order to impart the proper potential to the electrolyte.

In the case of condensers whose anode elements are provided with a film as generally formed by the well-known processes, very rapid disorganization of the film results because of this periodical rectification requirement, and this leads to large power losses and excessive heating in the condenser. With the novel hydrolyzed electrolyte film, as hereinbefore described, and by operating a capacitor within the range of voltages of which the critical bias is zero, a condenser may be operated continuously on alternating current and without bias with a power loss that is only slightly higher than the power loss in a biased operation. It will be understood that the term "critical bias" as applied to the biasing voltage has reference to the smallest negative voltage that must be imparted to the electrolyte in order to prevent the condenser from deteriorating while operating on alternating current. The film of the anodes in such condensers is to be formed at a maximum voltage that does not greatly exceed the peak operating voltage. It is not necessary, however, that the formation of such layer embody the subsequent and rapid treatment in an aqueous solution of an ionogen, if the lowest possible power factor of a non-biased operation be not required.

Where the capacitors are thus provided at only one rated voltage and it is desired to utilize the same in connection with apparatus operating on higher voltages which are multiples of the said rated capacitor voltage, these capacitors may nevertheless be utilized without bias of the electrolyte by placing in series a sufficient number of the capacitors to make up the operating voltage.

In Fig. 7, two capacitors 60 and 61, say of 110-volt rate, are connected in series across the leads 62 and 63 of, say, a 220-volt line; and it is preferred to bridge across each of these capacitors resistors 64 and 65, respectively, whereby the voltage applied to each capacitor will be limited to that within the range of voltages of which the critical bias is zero.

I claim:

1. An electrolytic condenser comprising a stack of interleaved separated flat rectangular electrodes having the lateral edges superposed and alternate electrodes extending a substantial distance at one end and intermediate electrodes at the opposite end to afford cooling fins, a highly viscous electrolyte between the electrodes preventing contact therebetween, an open-ended insulating wrapper extending transversely about the stack of electrodes, and narrow insulating sealing strips carried by the electrodes and positioned therebetween in alignment with the inner-end portions thereof, said wrapper and said sealing strips cooperating to prevent outflow of the electrolyte from between said electrodes.

2. An electrolytic condenser comprising a stack of interleaved separated flat rectangular electrodes having the lateral edges superposed and alternate electrodes extending a substantial distance at one end and intermediate electrodes at the opposite end to afford cooling fins, a highly viscous electrolyte between the electrodes preventing contact therebetween, an open-ended insulating wrapper extending transversely about the stack of electrodes, and resilient insulating narrow sealing strips carried by the electrodes and positioned therebetween in alignment with the inner-end portions thereof, said wrapper and said sealing strips cooperating to prevent outflow of the electrolyte from between said electrodes.

3. An electrolytic condenser comprising a stack of separated flat rectangular electrodes having superposed lateral edges, a highly viscous electrolyte between the electrodes preventing contact therebetween, an open-ended insulating wrapper extending transversely about the stack of electrodes, and narrow insulating sealing strips between the ends of the electrodes and carried thereby, said wrapper and said sealing strips cooperating to prevent outflow of the electrolyte from between said electrodes.

4. An electrolytic condenser comprising a stack of separated flat rectangular electrodes having superposed lateral edges, a highly viscous electrolyte between the electrodes preventing contact therebetween, an open-ended insulating wrapper extending transversely about the stack of electrodes, and narrow insulating resilient sealing strips between the ends of the electrodes and carried thereby, said wrapper and said sealing strips cooperating to prevent outflow of the electrolyte from between said electrodes.

JULIUS EDGAR LILIENFELD.